United States Patent [19]

Coppa

[11] Patent Number: 4,601,152
[45] Date of Patent: Jul. 22, 1986

[54] TRUSS STRUCTURE AND METHOD OF CONSTRUCTION

[75] Inventor: Anthony P. Coppa, Merion, Pa.

[73] Assignee: General Electric Company, Philadelphia, Pa.

[21] Appl. No.: 605,372

[22] Filed: Apr. 27, 1984

[51] Int. Cl.[4] .............................................. E04H 12/00
[52] U.S. Cl. ........................................ 52/637; 52/648; 52/693; 403/187; 403/205; 403/403
[58] Field of Search .................. 52/81, 632, 637, 638, 52/645, 646, 648, 690–696, DIG. 10; 403/170–172, 174, 176, 187, 205, 231, 403

[56] References Cited

U.S. PATENT DOCUMENTS

| 3,157,731 | 11/1964 | Torr | 403/174 |
|---|---|---|---|
| 3,221,464 | 12/1965 | Miller | 52/655 |
| 3,521,421 | 7/1970 | Schroeder | 52/648 |
| 3,746,345 | 7/1973 | Palazzolo | 446/127 |
| 3,789,562 | 2/1974 | De Chicchis et al. | 52/648 |
| 3,830,031 | 8/1974 | Soisson | 52/648 |
| 4,069,832 | 1/1978 | Bingham | 52/648 |
| 4,259,821 | 4/1981 | Bush | 52/309.1 |
| 4,308,699 | 1/1982 | Slysh | 52/108 |
| 4,337,560 | 7/1982 | Slysh | 29/155 R |
| 4,343,562 | 8/1982 | Almelard | 52/81 |
| 4,345,761 | 8/1982 | China | 52/DIG. 10 |
| 4,484,429 | 11/1984 | Stephenson | 52/648 |

FOREIGN PATENT DOCUMENTS

| 79155 | 6/1949 | Czechoslovakia | 52/DIG. 10 |
|---|---|---|---|
| 314458 | 7/1918 | Fed. Rep. of Germany | 52/DIG. 10 |
| 2025704 | 12/1971 | Fed. Rep. of Germany | 52/637 |
| 422760 | 6/1947 | Italy | 52/648 |
| 2063959A | 6/1981 | United Kingdom | 52/645 |

OTHER PUBLICATIONS

Chapter 25—1980 Systems Handbook—"Liquid Overfeed Systems".

Primary Examiner—John E. Murtagh
Assistant Examiner—Andrew Joseph Rudy
Attorney, Agent, or Firm—Allen E. Amgott

[57] ABSTRACT

A truss structure for use in orbital systems and methods of constructing the same are disclosed. The structure is characterized by high stiffness and a precisely determined geometry and takes the form of an oblique triangular prism. The structure is constructed of a plurality of substantially identical triangular frame elements which achieve high stowage volume efficiency during transport to the construction site.

5 Claims, 18 Drawing Figures

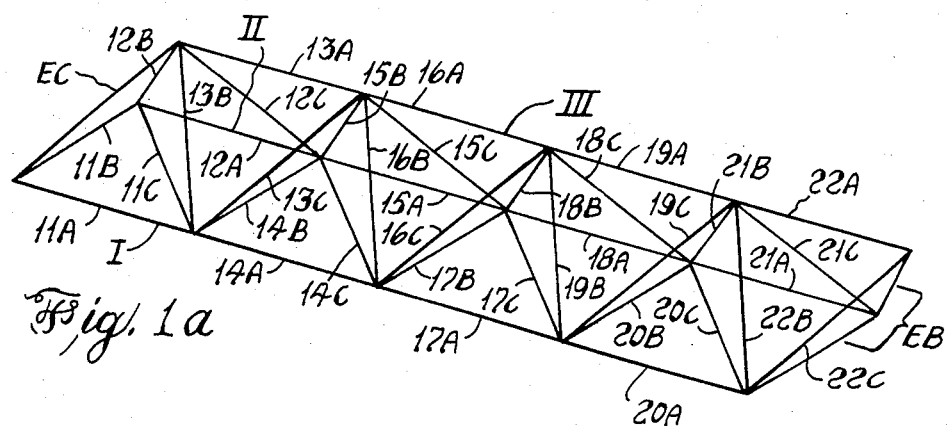
Fig. 1a
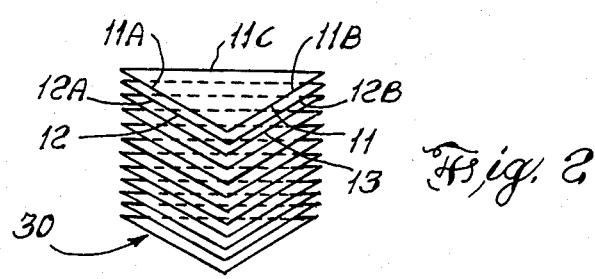
Fig. 1b
Fig. 2
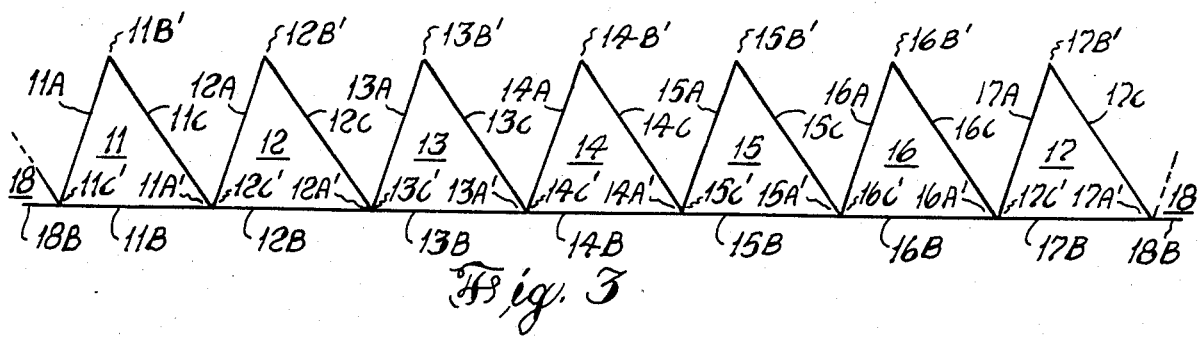
Fig. 3

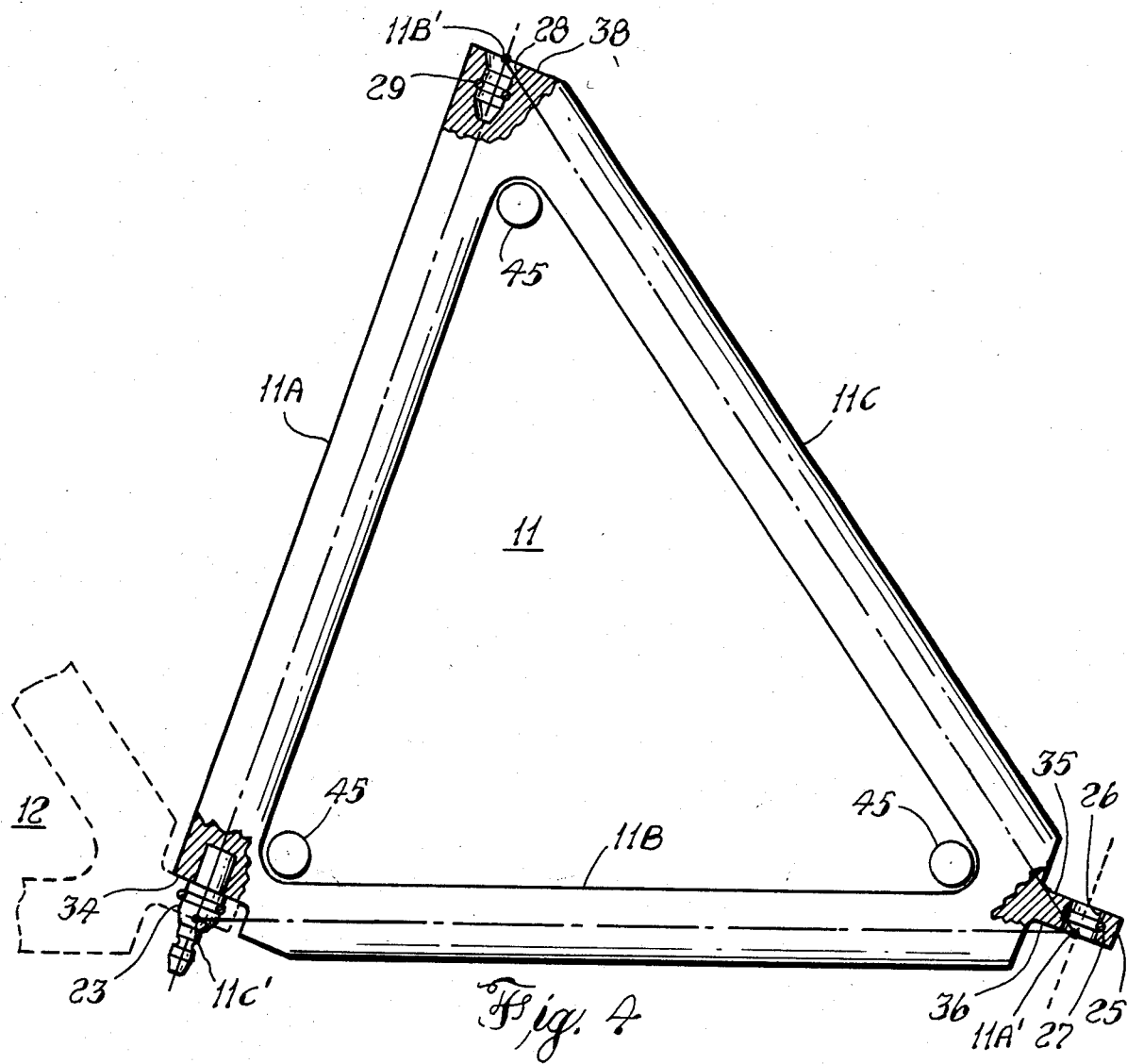
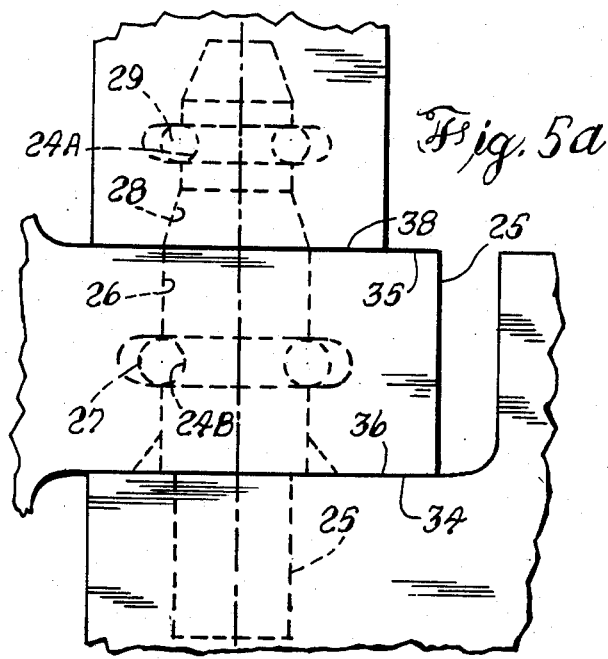
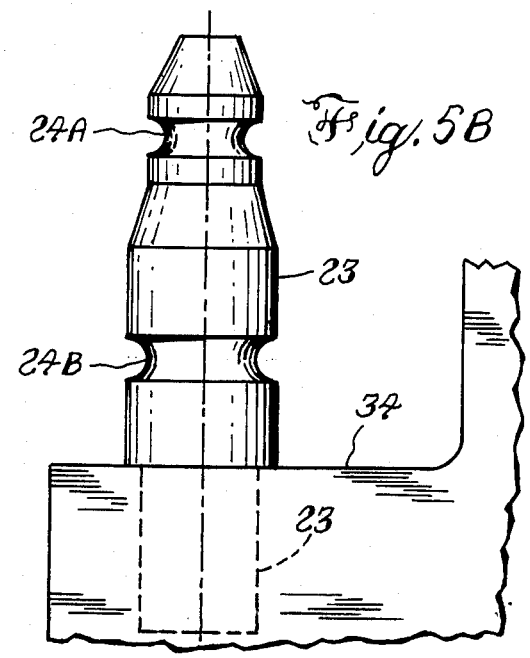

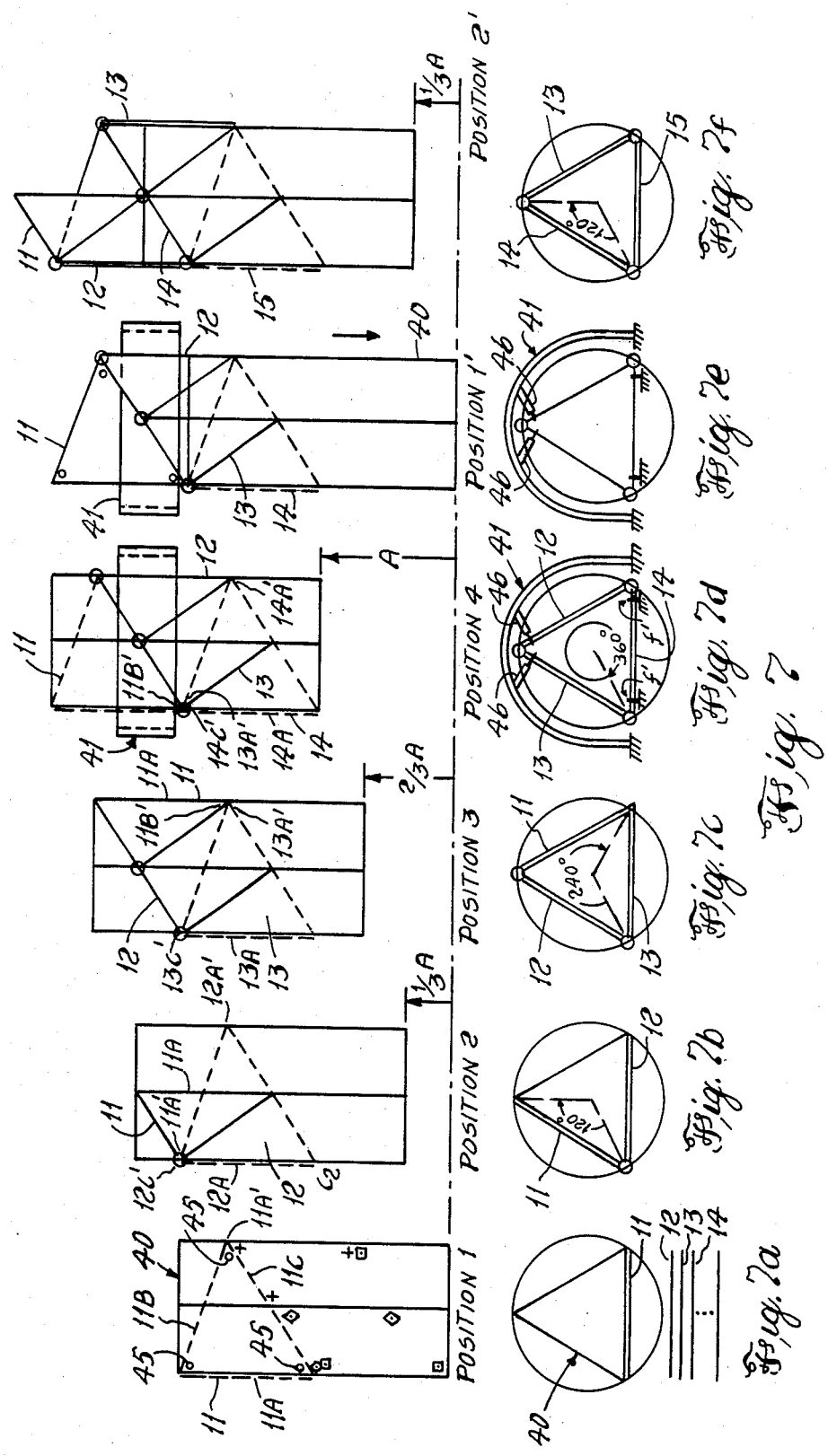

TRUSS STRUCTURE AND METHOD OF CONSTRUCTION

The present invention relates in general to truss structures intended for applications in outer space and methods of constructing such structures. More specifically the invention relates to a truss structure in the shape of an oblique triangular prism and methods of constructing such a structure from a plurality of disconnected triangular elements arranged in stacked form.

BACKGROUND OF THE INVENTION

To serve their assigned purpose, orbital space systems frequently require relatively large space structures. Such structures may include booms for sensors, solar arrays, platforms and networks. Since the size of these structures precludes transport by the space craft, the requirements of such structures invariably include minimum packing volume and minimum weight. Another requirement of such structures, conditioned by the cost of payload space and weight in space flight is a high ratio of stiffness in the erected state to the weight of the structure. A further requirement may be that the structure be capable of being erected from a fixed location, e.g. from the cargo bay of a space shuttle. Additionally, the procedure for constructing the structure must not be overly complex and must preferably avoid the use of heavy, bulky or complicated parts or equipment.

In addition to optimum structural efficiency, a precise self-determined geometry is desired. The use of a precise geometry will simplify the initial construction process, as well as the process of making additions to a previously completed structure.

Existing structures for orbital systems are subject to a number of disadvantages. Self-deployable structures, which automatically unfold and position themselves in space, are generally not efficient. Such structures generally carry a weight penalty because of the self-deployment function. Space structure concepts which are capable of manual or automated construction have often failed to achieve the necessary stiffness-to-weight ratio, stowage efficiency, simplicity of assembly from a fixed location and the required precision.

By way of example, U.S. Pat. No. 4,259,821 to Bush discloses a truss structure formed from structural columns. Due to its complexity, the structure shown in the patent does not lend itself to an automated assembly method suited to the limitations of a space environment. Another example of a space-erectable structure is shown in U.S. Pat. No. 4,337,560 to Slysh. The structure shown in the latter patent lends itself to an automated assembly technique, but is subject to several of the disadvantages set forth above. In particular, the structure disclosed in Slysh is incapable of construction from one fixed location. To overcome the deficiency, Slysh provides an assembler trolley which crawls along the erected structure as the latter is built up during construction.

OBJECTS OF THE INVENTION

It is a principal object of the present invention to provide a new and improved space-erectable structure and construction methods therefor which are not subject to the foregoing disadvantages.

It is a further object of the present invention to provide a truss structure having high rigidity and low weight, which uses identical, repeating elements for simplicity of construction.

It is another object of the present invention to provide a truss structure consisting of discrete elements which can be efficiently stowed in a small packing volume prior to construction.

It is yet another object of the present invention to provide a truss structure having a precise, self-determined geometry based on a plurality of identical, repeating elements connected to each other.

It is an additional object of the present invention to provide a relatively large space structure which can be constructed from a fixed location.

It is still a further object of the present invention to provide a simplified manual assembly method for constructing a relatively large structure in space.

It is yet another object of the present invention to provide an automated assembly method for erecting a relatively large structure in space.

SUMMARY OF THE INVENTION

These and other objects of the present invention are carried out by the disclosed structure and methods of erecting the same, wherein the structure, built up on congruent, planar, triangular frame elements, achieves a self-determined geometry and forms an oblique triangular prism having an equilateral triangular right cross-section. The triangular frame elements may be pre-fabricated or they may be assembled on site, each from three linear struts joined to form a triangle frame element. A plurality of such triangular elements are joined to form an elongate truss having high rigidity due, in part, to its equilateral triangular cross-section.

The truss structure which forms the subject matter of the present invention may be constructed manually from a chain of elements stowed in a stack. In such a method, the triangular elements are removed from the stack and then chained together such that the same vertex of each identical element is hingedly connected to another vertex of each adjacent element in the chain. The remaining vertex of each element is initially unconnected. The chain is manipulated such that each of the unconnected vertices is joined to a selected hinged connection. The invention also lends itself to a construction method wherein a stack, or stacks, of unconnected elements are used and the elements are coupled to each other during construction of the structure by the use of a suitable fabrication fixture.

These and other objects of the invention, together with the features and advantages thereof, will become apparent from the following detailed specification, when read with the accompanying drawings in which applicable reference numerals have been carried forward.

BRIEF DESCRIPTION OF THE DRAWINGS

FIG. 1(a) is a perspective view of a preferred embodiment of an erected truss structure in accordance with the present invention.

FIG. 1(b) is an exploded view of the truss structure of FIG. 1(a), showing the grouping of the triangular elements.

FIG. 2 shows substantially identical frame elements of the structure illustrated in FIG. 1(a), stacked for stowage preparatory to construction.

FIG. 3 illustrates the results of and first step in the method of constructing the truss structure of FIG. 1(a) in accordance with one embodiment of the invention.

FIG. 4 illustrates a preferred construction of a triangular frame element used in the present invention.

FIGS. 5(a) and 5(b) illustrate certain details of the element shown in FIG. 4.

FIGS. 7a–7F illustrate in greater detail the steps of the method shown in FIG. 6.

DETAILED DESCRIPTION OF THE INVENTION

Figure 6:
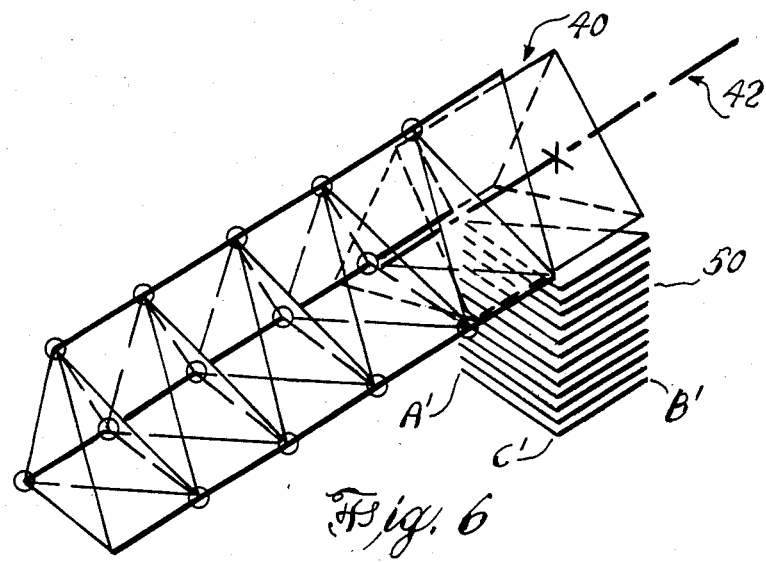
FIG. 6 illustrates the method of constructing a truss structure from a single stack of triangular elements using a fabrication fixture.

Referring now to the drawings, the truss structure illustrated in FIG. 1(a), and in exploded view in FIG. 1(b), comprises substantially identical triangular elements of the type shown in FIG. 4. As best seen in FIG. 4, element 11 includes first, second and third sides 11A, 11B, and 11C and oppositely positioned vertices 11A', 11B' and 11C' respectively. As used herein, the term vertex applies to the general area where two sides of the triangular element join.

FIG. 1(a) illustrates the arrangement of a plurality of triangular elements 11–22 in a truss structure which takes the form of an oblique triangular prism having an equilateral triangular right cross-section. The structure has lateral edges designated I, II and III, each such edge including the first sides of a particular group of triangular elements and the first vertices of a separate group of triangular elements.

The exploded view of FIG. 1(b) shows the triangular elements of FIG. 1(a) arranged in three different groups. Lateral edge I is shown to be comprised of first sides 11A, 14A, 17A and 20A of a first group of elements 11, 14, 17 and 20 respectively. The vertices opposite the first sides of the triangular elements in the first group, namely 11A', 14A', 17A' and 20A', lie in lateral edge II in the completed structure. Likewise, lateral edge II is comprised of a second group of elements 12, 15, 18 and 21, having first sides 12A, 15A, 18A and 21A respectively. Vertices 12A', 15A', 18A' and 21A' of the second group of elements lie in lateral edge III. Lateral edge III is comprised of a third group of elements 13, 16, 19 and 22 having first sides 13A, 16A, 19A and 22A respectively. Vertices 13A', 16A', 19A' and 22A' of the third group of elements lie in lateral edge I.

In accordance with the present invention, a particular relationship exists between the relative lengths of the sides of a triangular element. In a preferred embodiment, the first and second sides of each triangular element, such as sides 11A and 11B in FIG. 4, are equal in length. The length of the third side, e.g. side 11C in FIG. 4, is a $2/\sqrt{3}$ times one of the shorter sides. It will be understood that, where all three sides have different lengths, an unlimited number of relationships is possible. However, a truss structure constructed of triangular elements with all three sides of different length is less desirable for the purpose at hand, because of the lower structural efficiency in the erected state. Limitations also exist on the use of equilateral, triangular elements. For example, the method described with respect to FIGS. 2 and 6–9 could not be used with such truss elements to construct the structure shown in FIG. 1(a).

Triangular element 11 may consist of a single prefabricated unit, or it may comprise three substantially linear struts joined at their ends to form a triangle. FIG. 4 shows a preferred embodiment for the hinge connections at the vertices of a triangular element. A fastening pin 23 is located at vertex 11C' along with a bearing surface 34. As shown in FIG. 5, fastening pin 23 has a first groove 24A and also a second groove 24B which has a greater diameter than the first groove. Returning to FIG. 4, a tab 25 is seen to be located on vertex 11A' which includes bearing surfaces 35 and 36. The central axis of a through-hole 26 in tab 25 contains vertex 11A' as shown. Hole 26 contains a split retaining ring 27 adapted to mate with groove 24B in fastening pin 23. A socket 28 is located at vertex 11B' along with bearing surface 38. A split retaining ring 29 in socket 28 is adapted to mate with groove 24A in fastening pin 23.

As shown in FIG. 5(a), when connections are made between triangular elements during assembly, fastening pin 23 passes through through-hole 26, so that retaining ring 27 snaps into groove 24B, and fastening pin 23 enters socket 28 so that retaining ring 29 snaps into groove 24A. In the assembled state, bearing surfaces 35 and 36 of tab 25 are in contact with bearing surfaces 34 and 38 respectively of the elements joined by the fastening pin.

The method of constructing the aforesaid truss structure lends itself to a number of variations. In one embodiment, the triangular elements are initially arranged as a stack 30, as shown in FIG. 2, consisting of identically oriented, unconnected elements 11, 12, 13, etc. The triangular elements are carried into space and are transported to the construction site as a stack in the form shown in the drawing. FIG. 3 shows the same elements following the first step of the construction process. At this point in time, all elements have been hingedly connected to each other at vertex pairs 11A'/12C', 12A'/13C', etc., to form a chain. Chaining is carried out by joining the fastening pin of each element to the through-hole of the next element in the chain.

To form the truss structure shown in FIG. 1(a), the chain of triangular elements is manually folded to allow further connections at the vertices of respective elements. Vertex B' of each triangular element is then sequentially jointed to vertex pair A'/C' of the attached second and third subsequent elements in the chain. For example, vertex 11B' of element 11 is joined to vertex pair 13A'/14C' of attached elements 13 and 14, the latter elements constituting the second and third elements of the chain subsequent to element 11. Next, vertex 12B' is joined to vertex pair 14A'/15C' of attached elements 14 and 15, the latter elements constituting the second and third elements of the chain subsequent to element 12 in the sequential construction of the truss structure. This process continues until the third element before the ultimate element of the chain, which (third) element is joined to the last vertex pair of the chain, the latter consisting of the ultimate and penultimate elements in the chain. Thus, for each element N, prior to the second element before the ultimate element in the chain, the vertex B' of element N is joined to vertex pair A'/C' of attached elements N+2 and N+3. The structure is completed by joining vertex B' of element N+1 to vertex A' of the ultimate element in the chain and the addition of end struts to connect the free vertices at both ends, as explained below.

The exploded view of FIG. 1(b) illustrates the position of triangular elements 11–22 in the truss structure. As shown, two end struts EB, each having a length equal to one of the shorter sides of a triangular element, are added to connect the free vertices at one end of the structure. A third end strut EC, having a length equal to the longest side of a triangular element, is added at the other end of the structure. The end struts are preferably installed as the first and final steps of the assembly process. The resultant truss structure in the shape of an oblique triangular prism has an equilateral triangular right cross section. It is characterized by minimum packing volume and maximum stiffness-to-weight ratio and lends itself to being constructed from a fixed location. As the structure is completed, it is deployed in the desired direction in space. Additional elements, or even entire truss sections, may be easily joined to a completed truss structure, merely by removing the end struts, or by omitting them in the first place.

It should be noted that where the number of triangular elements used is a multiple of three, the resulting structure forms a true prism in which the bases of the prism are parallel upon the addition of the end struts. For a number of triangular elements which is not a multiple of three, a truncated prism results wherein the bases are not parallel. As used herein, the term "prism" refers either to a true or to a truncated prism.

The present invention is not limited to the method of construction described above. Thus, a further embodiment of the construction method employs a fabrication fixture 40 and a holding fixture 41 and utilizes triangular elements of the type shown in FIG. 4. The elements are stacked and unconnected at the outset of the operation. The stack, as shown at 50 in FIG. 6, comprises identically oriented triangular elements. As further seen from FIG. 6, fabrication fixture 40 has the form of a hollow triangular prism of equilateral triangular cross section and it is dimensioned so as to fit within the truss structure to be erected and to permit relative linear motion therebetween when desired. Thus, each lateral edge of the structure slides past a corresponding lateral edge of fixture 40 during such relative motion. The length of fabrication fixture 40 is at least twice the length of one of the shorter sides of a triangular element. Fixture 40 is rotatable about its central, longitudinal axis 42, which is seen to be parallel to the lateral edges of the erected truss structure.

During construction, rotation of fabrication fixture 40 occurs in discrete 120° increments, with suitable pauses between the rotation steps. With each 120° rotation, fixture 40 also advances along its central axis a distance of ⅓ times the length of one of the shorter sides of the triangular elements. Throughout the contruction process, triangular elements are serially fed to fixture 40 from stack 50, either manually or automatically. Fabrication fixture 40 further contains catches 45 or similar holding devices, best shown schematically in FIG. 4, which jointly grasp each triangular element inside the area of each vertex.

FIGS. 7(a) to 7(f) show the progress of the construction process by means of plan and elevation views, reference being had to both views. The process begins with fabrication fixture 40 in an initial position, designated as position 1 in FIG. 7(a). Triangular element 11 is fed to fixture 40 and is grasped by catches 45. As shown in FIG. 7(a), side 11A of triangular element 11 is placed along a lateral edge of fixture 40, but outside the latter, so as to form a part of the lateral edge of the truss structure to be erected. Vertex 11A' is placed immediately outside another lateral edge of the fabrication fixture so that it will lie in a different lateral edge of the completed truss structure.

Next, fabrication fixture 40 is rotated 120° about axis 42 in FIG. 6 and advanced ⅓ the length of side 11A to position 2, as shown in FIG. 7(b). Catches 45 continue to hold element 11 during this rotational and linear movement of fixture 40 and hence the element is rotated and linearly displaced from its previous position. The next element in stack 40, i.e. element 12, is now fed to fabrication fixture 40 and is positioned such that fastening pin 23 at vertex 12C' enters through-hole 26 of vertex 11A' and snaps into split retaining ring 27 at vertex 11A'. Additional catches 45 grasp element 12 such that side 12A is held in a lateral edge of the truss, as shown in FIG. 7(b).

During the next phase of construction, the fixture is rotated another 120° together with elements 11 and 12 and is advanced another third of the distance of side 11A to position 3, as shown in FIG. 7(c). Triangular element 13 is now fed to fixture 40 and is positioned such that fastening pin 23 at vertex 13C' enters through-hole 26 of vertex 12A' and snaps into split retaining ring 27 of vertex 12A'. Catches 45 on fixture 40 grasp element 13 such that side 13A is located in a lateral edge of the truss and vertex 13A' is located in another lateral edge of the truss, as shown in FIG. 7(c).

Next, fabrication fixture 40 undergoes another 120° rotation and advances in the manner previously described to reach the position shown in FIG. 7(d). Element 14 is now fed to fixture 40 and is positioned such that fastening pin 23 of vertex 14C' enters through-hole 26 of vertex 13A' and snaps into split retaining ring 27 of vertex 13A'. The positioning of element 14 is further effective to cause fastening pin 23 at vertex 14C' to enter socket 28 at vertex 11B' and to snap into split retaining ring 29 of vertex 11B'. This action accomplishes the initial closure of the truss into a rigid three-dimensional structure. Catches 45 on fabrication fixture 40 grasp element 14 such that side 14A lies in a lateral edge of the truss structure and vertex 14A' is located in another lateral edge of the truss structure.

Fabrication fixture 40 is now retracted to its starting position without, however, moving the truss structure. This is done by releasing the truss structure from catches 45 on fixture 40, but simultaneously using an external holding fixture 41 to hold the structure in place. As shown in FIG. 7(d), suitable catches 46 on the holding fixture grasp the truss structure during this interval. Upon being retracted to its initial position, as shown in FIG. 7(e), catches 45 on fabrication fixture 40 grasp the truss at each of the vertices of element 14 and at selected vertices of elements 12 and 13.

During the next phase of construction fabrication fixture 40 is rotated and advanced as previously described. Element 15 is now fed to the fabrication fixture and is positioned as previously described for element 14. It should be noted that, as construction continues, one vertex of each element added, starting with element 14, is fastened to separate elements of the truss structure under construction. Thus, for each remaining element N to be added, its fastening pin is connected to element N−1 and to element N−3.

The process continues until the elements in the stack have been exhausted, or a truss structure of the desired length has been constructed. If end struts are desired, they may be added as the first and last steps of the method. End struts may be parts of the stack, i.e. the first and last elements in the stack.

The construction method described above is capable of being fully automated and new truss elements are added from a single location only. The ability to use an automated process and to use triangular elements that may be stored at a site remote from the construction site confers flexibility on the described method in addition to savings in storage space and in the amount of manual intervention.

Figure 8:
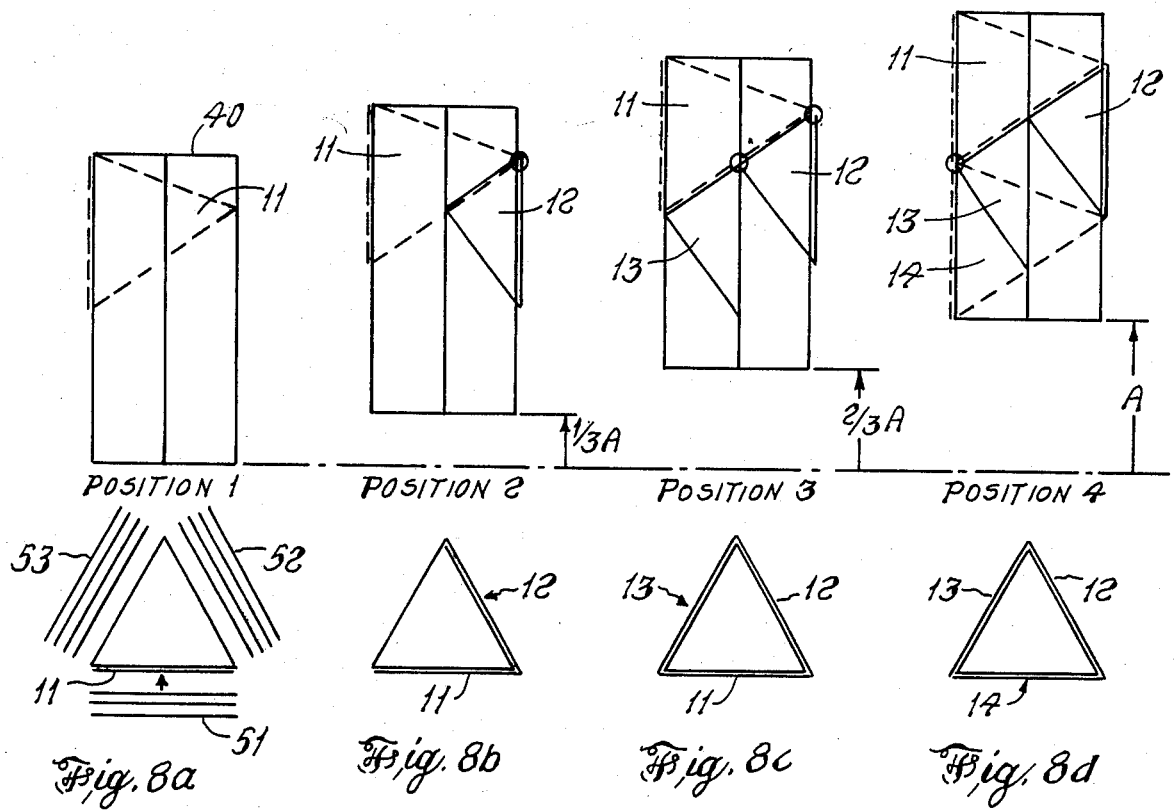
FIGS. 8a–8d illustrate a modification of the method of construction shown in FIGS. 6 and 7.

A further refinement of the construction method herein, particularly where elements are mechanically fed to the fabrication fixture, eliminates the need for the fabrication fixture to be rotated. This is accomplished by using three stacks of elements positioned at three different locations around the fabrication fixture. The respective elements are fed to the fixture from these three locations, as best illustrated in FIG. 8. The truss so constructed is shown in FIG. 8(a), (b), (c) and (d) and is identical to that built by the method described earlier.

The method shown and described in connection with FIG. 8 is the same as that described previously, with the exception that fabrication fixture 40 is not rotated and triangular elements are fed sequentially from three stacks of elements 51, 52 and 53. The principal advantage of this technique is the absence of any angular momentum during construction and the elimination of equipment for rotating the fabrication fixture. Further, this technique allows devices, e.g. solar cells, to be deployed on the structure during construction. It also simplifies the positioning of the elements, and it simplifies the construction of two or more parallel trusses with other devices, e.g. solar cells, suspended between or among them, since such other devices may be added during construction only if the supporting trusses do not rotate.

It will be clear to those skilled in the art that fabrication fixture 40 may be simplified where elements are manually fed to the fixture. For example, the fabrication fixture in FIG. 7 need not rotate where an astronaut is used who is capable of manually feeding elements to a plurality of locations.

The truss structure and methods of construction which constitute the subject matter of the present invention, confer advantages which make them particularly suited for use in orbital structures. While the assembled structure maximizes the stiffness-to-weight ratio, the unassembled elements have a small packing volume and minimum weight. Further, the truss structure lends itself to being erected from a fixed location and it has a precise, self-determined geometry. The various embodiments of the construction method described above are readily performed in space, in part because repeating, identical elements are used.

While preferred embodiments of the present invention have been shown and described herein, it will be obvious that such embodiments are provided by way of example only. Numerous variations, changes, departures, substitutions and partial and full equivalents will now occur to those skilled in the art without departing from the invention herein. Accordingly, it is intended that the invention be limited only by the spirit and scope of the appended claims.

What is claimed is:

1. An elongate prism-form truss structure defined by three parallel lateral edges and having an equilateral triangular cross section perpendicular to said lateral edges, said structure comprising a plurality of planar, congruent, triangular frame elements each having first, second and third sides opposite structurally mutally different first, second and third vertices respectively, said first and second sides of each of said elements being substantially equal in length and said third side of each of said elements being substantially $2/\sqrt{3}$ times one of the shorter sides, said elements being joined at their vertices and being arranged in three separate groups in said structure such that each lateral edge contains all first sides of the elements of a single group only and another lateral edge contains all first vertices of said last-recited group of elements.

2. A truss structure according to claim 1 wherein each of said triangular frame elements includes three substantially linear struts joined at their ends to form a triangle.

3. A truss structure according to claim 1 and further including means interconnecting the free vertices of said triangular frame elements at each end of said structure.

4. A truss structure according to claim 1 wherein each of said triangular frame elements includes hinge connections at its vertices, said connections comprising:
   a tab extending from said first vertex, said tab including a through-hole having an axis parallel to said first side;
   said second vertex including a socket having an axis aligned with said first side; and
   a fastening pin extending from said third vertex aligned with said first side, said fastening pin being adapted to engage a through-hole and a socket of two additional elements to join all three elements at their vertices.

5. A truss structure according to claim 4 wherein said second and third vertices each include a bearing surface substantially perpendicular to said first side, and wherein said tab includes a pair of parallel bearing surfaces substantially perpendicular to said first side; said connections further comprising:
   first and second grooves in said fastening pin;
   a split retaining ring positioned in said through-hole and adapted to mate with said second groove; and
   a split retaining ring positioned in said socket adapted to mate with said first groove;
   whereby said bearing surfaces on said tab make contact with said bearing surfaces on said second and third vertices of the elements joined by said fastening pin.

* * * * *